July 2, 1968
L. C. FETTERLY
3,391,213
ISOPRENE PRODUCTION FROM ISOPENTANE VIA
HYDROPEROXIDE AND BORATE ESTER
Filed June 12, 1967
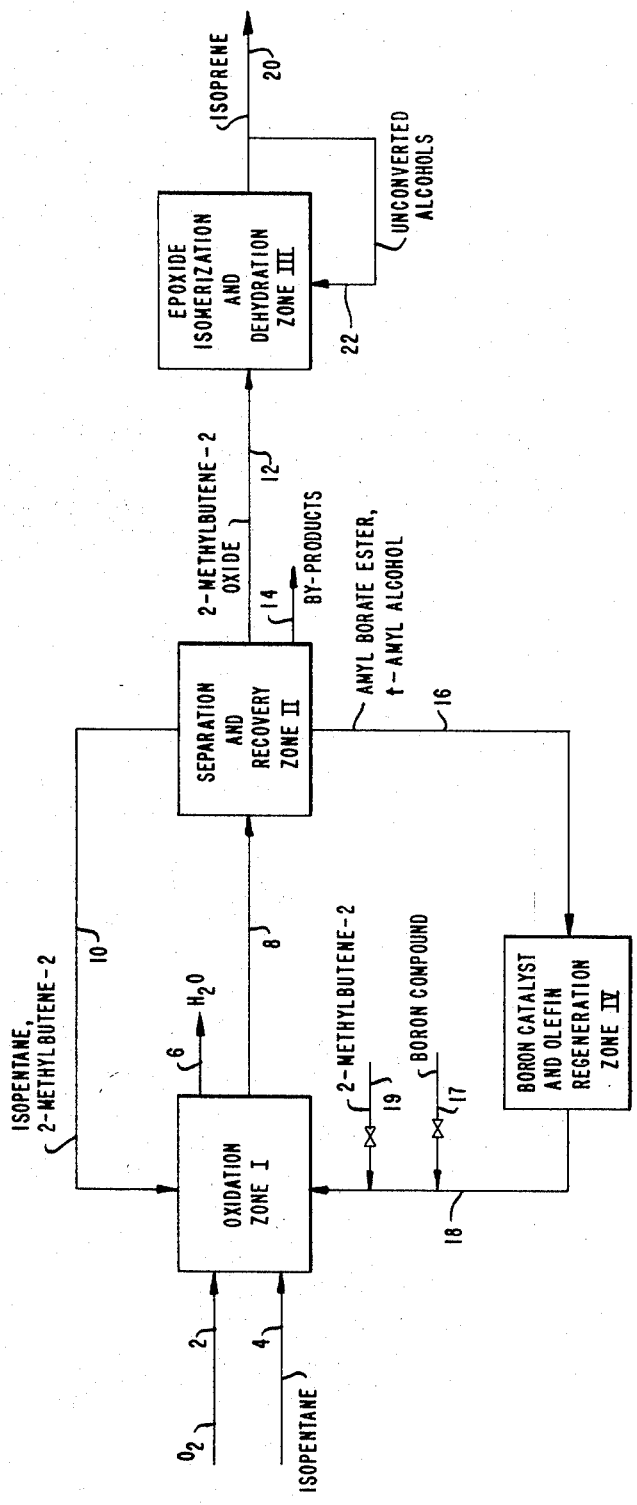
INVENTOR:
LLOYD C. FETTERLY
BY:
HIS ATTORNEY

United States Patent Office 3,391,213
Patented July 2, 1968

3,391,213
ISOPRENE PRODUCTION FROM ISOPENTANE VIA HYDROPEROXIDE AND BORATE ESTER
Lloyd C. Fetterly, Oakland, Calif., assignor to Shell Oil Company, New York, N.Y., a corporation of Delaware
Filed June 12, 1967, Ser. No. 645,399
4 Claims. (Cl. 260—681)

ABSTRACT OF THE DISCLOSURE

Isopentane is oxidized in the presence of a boron compound and 2-methylbutene-2 to produce 2-methylbutene-2 oxide and tertiary amyl alcohol or the borate ester thereof; the 2-methylbutene-2-oxide is subsequently converted by isomerization and dehydration to isoprene, and the tertiary amyl alcohol or borate ester thereof is separately converted to 2-methylbutene-2 for recycle to provide the 2-methylbutene-2 in the oxidation zone.

BACKGROUND OF THE INVENTION

Field of the invention.—Isoprene is an important substance primarily because of its established utility as a precursor for the production of synthetic polyisoprene, for which there is an increasing demand. The chemical industry's ability to expand production of isoprene is however faced with serious limitations, due particularly to the high cost of raw material and production generally encountered using the processes available heretofore. (An analysis of the problems facing current and potential producers of isoprene is found in the Apr. 3, 1967, issue of Chemical and Engineering News.)

Description of the prior art.—One of the principal processes for producing isoprene is the catalytic dehydrogenation of isoamylene recovered from refinery streams. Some of the more pertinent catalysts for the process are described in the following United States patents: Eggertsen et al, No. 2,414,585, issued January 21, 1947; Kleiber et al., No. 2,414,816, issued January 28, 1947 and Kearby, No. 2,426,829, issued September 2, 1947. Another commercial process comprises dimerization of propylene to 2-methylpentene-1, subsquent isomerization to 2-methylpentene-2 and pyrolysis of the 2-methylpentene-2 to isoprene and methane.

Summary of the invention

It has now been found that isoprene can be produced from isopentane and oxygen in an improved, cyclic-type, process according to the following overall net reaction:

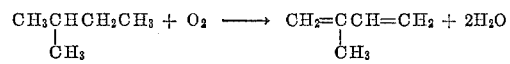

Briefly stated, the cyclic-type process of the invention comprises (1) oxidizing isopentane to tertiary amyl hydroperoxide and reacting the tertiary amyl hydroperoxide in situ with 2-methylbutene-2 in the presence of an oxyboron compound to produce 2-methylbutene-2 oxide, tertiary amyl alcohol and/or the borate ester thereof, (2) separating the 2-methylbutene-2-oxide and catalytically isomerizing and dehydrating it to isoprene and (3) subjecting the tertiary amyl alcohol and the borate ester thereof to dehydration and decomposition over acidic catalysts to produce 2-methylbutene-2 and oxyboron compound for recycle.

BRIEF DECRIPTION OF DRAWING

For better understanding of the invention, recourse is had to the accompanying drawing wherein the sole figure is a schematic flow diagram showing one form of apparatus suitable for carrying out the invention. In the drawing, I designates an oxidation zone, II a separation and recovery zone, III an epoxide isomerization and dehydration zone and IV a boron catalyst and olefin regeneration zone. For convenience and clarity, parts of apparatus not essential to a complete understanding of the invention such as means for providing heat, refrigeration, stirring, pressure control, cooling, separations, and the like have been omitted from the drawing. The location of such means will be apparent to one skilled in this art.

With reference to the drawing, operation of the invention may be summarized as follows. 2-methylbutene-2 and oxyboron compound are charged to the oxidation reactor, desigated as zone I, maintained at desired reaction conditions of temperature and pressure. An oxygen-containing gas is introduced through line 2 and isopentane is charged through line 4. Water produced during the oxidation may be removed through line 6. Reaction mixtures formed comprising 2-methylbutene-2 oxide, tertiary amyl alcohol and borate ester thereof, together with unreacted isopentane and 2-methylbutene-2 as well as oxyboron compounds are removed through line 8 to the separation and recovery zone II where light ends, e.g., comprising isopentane and 2-methylbutene-2, are separated and recycled by line 10 to the oxidation reactor. Reaction products comprising 2-methylbutene-2 oxide are passed through line 12 to the isomerization and dehydration zone III for further processing. Any by-products may be removed by line 14. The remainder of the reaction mixture comprising tertiary amyl alcohol, the borate ester thereof, and unreacted oxyboron compound is passed through line 16 to the boron catalyst and olefin regeneration zone IV. Regeneration products comprising 2-methylbutene-2 and regenerated oxyboron compound, as well as any unreacted oxyboron compound, are recycled from zone IV by line 18 to the oxidation reactor I. Lines 17 and 18 are provided for introducing oxyboron compound and 2-methylbutene-2 from an outside source into line 18 leading into the oxidation reactor when starting up the process. Once underway, such introduction is stopped and the necessary oxyboron compound and 2-methylbutene-2 are continuously made available from the boron catalyst and olefin regeneration zone IV. Isoprene formed in the epoxide isomerization and dehydration zone III is removed therefrom by line 20. Charge to zone III unconverted therein may be recycled thereto by line 22.

DESCRIPTION OF PREFERRED EMBODIMENTS

The oxidation zone.—In the single oxidation zone I, the peroxidation of isopentane and the epoxidation of 2-methylbutene-2 are carried out simultaneously in the presence of an oxyboron compound. Initially, isopentane is peroxidized at the tertiary carbon atom by oxygen to produce tertiary amyl hydroperoxide which essentially simultaneously reacts with 2-methylbutene-2 under conditions selected so that the oxyboron compound tends to bring about decomposition of the hydroperoxide to the corresponding tertiary amyl alcohol with concomitant epoxidation of the 2-methylbutene-2 to the corresponding epoxide. During the epoxidation, at least a portion of the tertiary amyl alcohol forms an amyl borate ester with the oxyboron compound. The manner in which the oxyboron compound affects the peroxidation of isopentane and affects the epoxidation of the 2-methylbutene-2 by the tertiary amyl hydroperoxide is not known with certainty, although it is believed that in the epoxidation reaction the hydroperoxide and oxyboron compound react to form a perborate ester intermediate which then reacts with the olefinic unsaturation to give the olefin epoxide and borate ester of tertiary amyl alcohol. Such boron catalyzed oxidations are discussed in the copending application of Fetterly et al, Ser. No. 485,563, filed Sept. 7, 1965.

Boron catalysts useful in the process of this invention include boron oxides, such as $B_2O_3$, dehydrated boric acids—especially metaboric acid in the boroxide form alone or containing other hydroxy-boron compounds comprising at least one B—O—B linkage—and the hydrocarbyl esters thereof, particularly alkyl esters. A preferred group of alkyl esters consists of the triamyloxyboroxines. Trialkoxyboroxines broadly, and in general, those containing from 1 to 10 carbon atoms in each alkoxy groups are particularly useful. Preparation of metaboric acid in the boroxine form and the hydrocarbyl esters thereof is summarized in H. Steinberg, "Organoboron Chemistry", Vol. 1, 445—454, Interscience Publishers (Wiley), New York, 1964.

To obtain proper selectivity to 2-methylbutene-2 oxide and tertiary amyl alcohol in oxidation zone I and to avoid undesirable side reactions such as the formation of the hydroperoxide of the 2-methylbutene-2 and decomposition of the 2-methylbutene-2 oxide, it is essential to provide the reactants and catalyst within certain well defined relative proportions.

The oxyboron compound is provided in sufficient quantity to obtain maximum conversion of the 2-methylbutene-2 to the epoxide product. A suitable amount of oxyboron compound is about 0.02 gram-atom per 100 grams of isopentane and 2-methylbutene-2, but about one-fourth to about six times that amount can be used; generally preferred is about one half to about twice that amount.

In the oxidation zone I, isopentane serves both as a reactive species for oxidation to tertiary amyl hydroperoxide and as a diluent. The use of isopentane in high concentration provides the necessary proportion of C-to-H linkages for efficient hydroperoxide formation, thereby minimizing direct oxidation of the 2-methylbutene-2 to olefin hydroperoxides. Consequently, it is important to provide a molar ratio of isopentane to 2-methylbutene-2 of at least about 5:1, although molar ratios of about 10:1 to about 20:1 are preferred.

Although isopentane is preferably used as diluent, other solvents or diluents which are substantially oxidatively inert, thermally stable, and liquid at the reaction temperatures and pressures are suitably employed. Illustrative solvents include fully esterified polyacyl esters of polyhydroxyalkanes such as glycerol triacetate, tetraacyl esters or erythritol, diethylene glycol diacetate; mononuclear haloaromatics such as chlorobenzene, bromobenzene, and dichlorobenzene; organic nitriles such as acetonitrile, propionitrile, and adiponitrile; and saturated hydrocarbons particularly the paraffinic hydrocarbons such as decane, dodecane, Decalin, and cyclohexane.

The oxygen reactant is charged to the reaction zone as molecular oxygen or in admixture with an inert gas diluent, e.g., nitrogen. Molecular oxygen, usually at about 3–20% volume concentration in an inert gas, e.g., nitrogen, is suitably employed. Largely for economic reasons, the oxygen-containing gas preferably charged to the process of the invention is air. This may be further diluted with a diluent gas such as nitrogen. The oxygen partial pressure in the oxidation zone I is controlled to produce a sufficient concentration of tertiary amyl hydroperoxide to react with the 2-methylbutene-2. The rate of epoxidation of the 2-methylbutene-2 by the hydroperoxide is significantly faster than the oxidation of isopentane to the hydroperoxide; therefore, it is advantageous to produce the hydroperoxide as rapidly as it is consumed in reaction with 2-methylbutene-2. High concentrations of the hydroperoxide are, however, preferably not allowed to be built up in order to minimize undesirable reactions. Oxygen partial pressures of from about 5 p.s.i.g. to about 150 p.s.i.g. are generally satisfactory; however partial pressures of from about 10 p.s.i.g. to about 100 p.s.i.g. are usually preferred. It is, of course, appreciated that the oxygen concentration is always adjusted to avoid explosive mixtures within the reactor.

The oxidation reactions in the oxidation zone I are conducted at elevated temperatures. Suitable reaction temperatures to be maintained in reaction zone I may vary from about 100° C. to about 200° C. although best results generally are obtained when temperatures from about 125° C. to about 175° C. are employed. Lower boiling reactants require that the oxidation reactions be conducted at pressures which are sufficiently high to insure that at least a substantial part of the reactants are present in the liquid phase. Reactor pressures of from about 100 p.s.i.g. to about 1000 p.s.i.g. are satisfactorily employed.

Separation recovery zone.—Effluent from oxidation zone I is continuously passed into a separation and recovery zone II. The rate of reaction mixture withdrawal from the oxidation zone I varies depending upon the extent of 2-methylbutene-2-oxide formation. Typically, the rate of reaction mixture withdrawal from the reaction zone I is adjusted to maintain a 2-methylbutene-2 oxide to 2-methylbutene-2 molar ratio of from about 1:3 to about 1:30, although molar ratios of from about 1:5 to about 1:10 are preferred. As reaction mixture is continuously withdrawn from zone I reactants are continuously charged thereto to maintain the reactants in the defined molar ratios.

The separation and recovery zone II may comprise a suitable fractionation unit or similar conventional separation apparatus. Isopentane and 2-methylbutene-2 are separated within zone II and recycled to the oxidation zone I. The 2-methylbutene-2 oxide is separated in zone II and passed to the isomerization and dehydration zone III wherein the epoxide is converted to a final product of the process, isoprene. The remainder of the reaction mixture emanating from the oxidation reactor I which comprises tertiary amyl alcohol and boron compounds—both the oxyboron compound and amyl borate esters—is passed to the boron catalyst and olefin regeneration zone IV.

Boron catalyst and olefin regeneration zone.—In the boron catalyst and olefin regeneration zone IV, tertiary amyl alcohol is dehydrated and amyl borate esters are decomposed, both reactions producing 2-methylbutene-2 which is continuously recycled to the oxidation reactor I. The decomposition of the amyl borate esters results in regeneration of the oxyboron compound which is also continuously recycled to the oxidation zone I. These continuous recycles from zone IV to zone I thus provide the essential 2-methylbutene-2 reactant and oxyboron charge to zone I once the process is under way.

Decomposition of amyl borate ester in zone IV is carried out in the presence of a suitable solid inorganic catalyst. Suitable catalysts comprise those disclosed heretofore as effective in the decomposition of borate esters. Suitable inorganic catalysts comprise, for example, those capable of functioning as both hydration and dehydration catalysts, as hydrogenation and dehydrogenation catalysts, as hydrocarbon cracking catalysts and the like. Illustrative of such suitable catalysts are: alumina, tungsten oxide and thoria and inorganic materials known as siliceous refractory oxides. Suitable siliceous refractory oxides include synthetic composites as well as acid treated clays and similar materials such as crystalline aluminosilicates known in the art as molecular sieves. In general, synthetic siliceous catalysts are preferred over natural occurring materials or molecular sieves, and exemplary synthetic siliceous catalysts include silica-alumina, silica-magnesia, silica-alumina-titania, silica-alumina-zirconia, silica-titania-zirconia, silica-magnesia-alumina and the like. Particularly preferred are acidic inorganic catalysts comprising a compound of tungsten or thorium, for example, tungsten oxide, tungsten sulfide or thoria.

The suitable catalysts may be employed in admixture with suitable solid support or diluent materials such as diatomaceous earth, pumice, clays, various inert silicates, etc. The suitable catalyst may comprise those prepared by depositing a suitable catalyst on a carrier in any conventional manner such as impregnation, precipitation, coprecipitation, ion-exchange, mechanical mixing and the like.

Particularly preferred catalysts comprise those effective both for the decomposition of the amyl borate esters as well as the dehydration of the tertiary amyl alcohol. The dehydration and decomposition steps are advantageously performed in a single zone. The reaction conditions sufficient to decompose the amyl borate esters are substantially the same as conditions generally prescribed to dehydrate the tertiary amyl alcohol, and no significant problems are encountered by combining the reactions.

The invention is not limited by the particular method preferably employed to effect the decomposition of the amyl borate esters and dehydration of the tertiary amyl alcohol. In one modification, the tertiary amyl alcohol and amyl borate esters are passed in continuous flow through an externally heated tubular reactor containing the catalysts, for example, a silica-alumina hydrocarbon cracking catalyst. Particular temperature conditions preferably employed will vary in accordance with the specific catalyst employed. Temperatures varying from about 150° C. to about 300° C. will generally be found suitable, but temperatures of about 100° C. to about 400° C. are employed within the scope of the invention. Suitable reaction pressures may vary for example, from about 50 p.s.i.g. to about 1000 p.s.i.g. although reaction pressures from about 100 p.s.i.g. to about 700 p.s.i.g. will generally be preferred.

While the use of diluents is not necessary to the carrying out of the reactions within zone IV, they may advantageously be employed. Examples of suitable diluents are aliphatic hydrocarbons as the paraffins, heptane, octane, and decane, and the aromatic hydrocarbons such as benzene and toluene, etc.

Subsequent to the reactions, the resulting reaction mixtures formed in zone IV may be separated by conventional means such as fractional distillation, selective extraction, and the like. The dehydration and decomposition reactions give almost exclusively 2-methylbutene-2 and regenerated oxyboron compound with only small amounts of 2-methylbutene-1 and 2-methylbutene-3.

Although it is preferable to carry out the dehydration of the tertiary amyl alcohol and decomposition of the borate ester in this separate zone (IV), it should be pointed out that these reactions take place to at least a substantial degree within the oxidation zone I itself thereby reducing materially the amount of tertiary amyl alcohol and borate ester in the effluence from the oxidation zone I. By control of the reaction conditions in the oxidation zone I substantially complete dehydration of the tertiary amyl alcohol and decomposition of the borate ester may be caused to take place with only small decrease in the yield of oxide product.

Epoxide isomerization and dehydration zone.—The final stage of the integrated process comprises the conversion of 2-methylbutene-2 oxide to isoprene by the successive or conjoint steps of isomerization of 2-methylbutene-2 oxide to the allylic alcohol form which is dehydrated to isoprene. The isomerization of the 2-methylbutene-2 oxide and the dehydration of the resulting allylic alcohol may be carried out sequentially in consecutive reactors or may be effected simultaneously in a single reactor. Catalysts employed in the consecutive stage operation comprise those known to effect the isomerization of epoxides to alcohols of allylic structure, such as for example, trilithium phosphate, etc. The dehydration of the resulting allylic alcohol may be executed in the presence of a suitable dehydration catalyst, such as for example, the phosphate dehydration catalysts as boron phosphate and lithium phosphate, titanium oxide, alumina, etc. In a preferred embodiment of the invention, the olefin oxide isomerization and the alcohol dehydration are carried out concurrently in a single reaction zone. Catalysts suitably used for the simultaneous isomerization and dehydration comprise acidic-type catalysts such as acidic metal oxides, siliceous refractory oxides, alkali and alkaline earth metal phosphates. Illustrative acidic oxides include alumina, chromia, thoria, and titania; illustrative siliceous refractory oxides include silica-alumina, silica-magnesia, silica-titania and silica-magnesia-zirconia; and illustrative alkali and alkaline earth phosphates are lithium phosphate and magnesium phosphate. A particularly preferred catalyst comprises thoria.

The concurrent isomerization and dehydration of the 2-methylbutene-2 oxide is preferably conducted in the fluid phase with or without the presence of an added diluent of solvent. When a solvent is employed, the solvent is suitably an aliphatic, aromatic or cycloaliphatic hydrocarbon solvent which is free from any substantial amount of non-aromatic unsaturation and which is fluid at the reaction temperatures and pressures employed. Suitable aliphatic hydrocarbons solvents comprise alkanes or straight chain and cyclic structure such as isopentane, hexane, octane, isooctane, decane, cyclohexane, cyclopentane, methylcyclopentane, Decalin, etc.; aromatic hydrocarbons, such as benzene, toluene, xylene and ethylbenzene, etc., are at times employed with advantage.

Operation of the 2-methylbutene-2 oxide conversion to isoprene may be carried out in any suitable manner. In one method of operation the liquid mixture is passed in a continuous stream through a column packed with the catalyst. The reaction mixture may suitably be passed downwardly through a column containing the suitable catalyst in the form of a stationary bed. Reaction conditions comprise the use of elevated temperature and pressure. Temperatures employed will depend to some extent on the particular catalyst used. In general, temperatures of from about 100° C. to about 300° C., more preferably from about 150° C. to about 250° C. are employed. Pressures sufficiently high to maintain at least a substantial part of the reactants in the liquid phase are generally preferred. Suitable pressures may vary from about 15 p.s.i.g. to about 1000 p.s.i.g. Pressures from about 20 p.s.i.g. to about 200 p.s.i.g. are preferred. Reaction products obtained are separated in suitable separating means and the desired isoprene product recovered. Conventional methods such as fractionation, solvent extraction, extractive distillation, adsorptive separation and the like, may be employed in the product separation and recovery operation.

The separate stages of the integrated process may be carried out batchwise, intermittently or continuously. The process lends itself with particular advantage to continuous operation. The invention is not limited with respect to the specific apparatus, such as reaction chambers, and the like, employed in the execution of the individual integrated steps.

To further illustrate the process of the invention, the following examples are provided. It should be understood that the details thereof are not to be regarded as limitations, as they may be varied as will be understood by one skilled in this art.

Example I

A mixture of isopentane, 2-methylbutene-2 (once started, 2-methylbutene-2 is generated within the process) and tri-amyloxyboroxine is charged to a stainless-steel reactor designated in the drawing as oxidation zone I. The reactor is heated to 140° C. with an electrical resistance heating jacket. Air with an oxygen content reduced to 10% by volume by dilution with nitrogen is charged to the reactor to bring the pressure to 700 p.s.i.g. The condenser system in the reactor is provided with a back-pressure valve to maintain pressure in the reactor at 700 p.s.i.g. The condensates from the condenser system are collected in a phase separator. Upper phase liquid is permitted to drain back continuously to the reactor, while the water layer is removed intermittently through a drain valve designated at line 10. Noncondensable gases are released by a back pressure regulator to a central system equipped with analyzers to determine the oxygen contents.

The reactor I is maintained at a temperature of 140° C. and a pressure of 700 p.s.i.g. until about 20% of the 2-methylbutene-2 is converted to 2-methylbutene-2 oxide. The reaction mixture is then withdrawn continuously through line 8 to the separation and recovery system. The rate of withdrawal is adjusted to maintain the 2-methylbutene-2 oxide to 2-methylbutene-2 molar ratio at about 1:5. As the reaction mixture is withdrawn, isopentane is charged to the reactor through line 4. At the same time, makeup 2-methylbutene-2 (until available from within the process) and fresh boron catalyst are added to the reactor to maintain the molar ratio of isopentane to 2-methylbutene-2 at about 10:1 and the catalyst concentration at about 0.02 gram-atom per 100 grams of isopentane and 2-methylbutene-2.

The withdrawn liquid is fractionated in the separation and recovery zone II. The low boiling components, isopentane, B.P. 27–28° C., and 2-methylbutene-2, B.P. 38–39° C., are recovered and recycled through line 10 to the oxidation zone I. 2-methylbutene-2 oxide, B.P. 70–78° C., is recovered and passed through line 12 to a tubular reactor (designated as isomerization and dehydration zone III) containing a fixed bed of thoria at a temperature of 300° C. A slow stream of nitrogen is passed through the tubular reactor to aid the passage of the reactant and products through the catalyst bed. The product is distilled to give isoprene, B.P. 33–35° C., and unconverted allyl alcohols which are recycled to the reactor through line 30.

The higher boiling components, e.g., tertiary amyl alcohol, amyl borate esters and tri-ti-amyloxyboroxine, are passed to a tubular reactor (designated as boron catalyst and olefin regeneration zone IV) packed with 20% tungstic oxide on alumina and heated to a temperature of about 200° C., wherein substantially complete conversion of the alcohol and borate esters to 2-methylbutene-2 is achieved. The 2-methylbutene-2 and boron compound products are recycled through line 18 to the oxidation reactor I; small amounts of 2-methylbutene-1, B.P. 31–32° C., and 2-methylbutene-3, B.P. 20–21° C., are separated by distillation and recovered as by-products.

The oxidation reactions in the oxidation zone proceed with high selectivity to 2-methylbutene-2 oxide and tertiary amyl alcohol or borate esters thereof. Consequently, when the process of invention is initially started only small amounts of by-products are produced. However, during continuous operation of the process, the concentrations of by-products are continuously increasing and hence the by-product fraction is recovered through line 14 as shown in the drawing.

After 2-methylbutene-2 and boron catalysts are continuously recycled to oxidation reactor, only isopentane and air are charged as reactants. After continuous operation is achieved, of every 100 g. of isopentane charged to the oxidation reactor, 2.8 kg. is converted per hour to reaction products. The isoprene yield is 74.2% calculated on propylene converted.

Example II

In this example the same apparatus was used as in Example I, but boron oxide is used as the boron catalyst. The oxidation reactor 6 is pressurized to 700 p.s.i.g. in the same manner as described in Example I, except that oxygen content was held to 5% volume. After continuous operation is achieved, 2.3 kg. of isopentane is converted per hour; and of every 100 g. converted 65.1 g. is converted to isoprene.

I claim as my invention:

1. A cyclic-type process for producing isoprene from isopentane and an oxygen-containing gas which comprises:
    (a) oxidizing isopentane in an oxidation zone with an oxygen-containing gas in the presence of an oxyboron compound and 2-methylbutene-2 to produce 2-methylbutene-2 oxide, tertiary amyl alcohol and the borate ester of tertiary amyl alcohol, the oxyboron compound being selected from the group consisting of boron oxides, dehydrated boric acids and the alkyl esters thereof and is present in an amount of from about 0.005 to about 0.12 gram-atom of boron per 100 grams of isopentane and 2-methylbutene-2;
    (b) withdrawing continuously the resulting oxidation product mixture and separating therefrom
        (1) a fraction containing isopentane and 2-methylbutene-2 for recycle to the oxidation zone;
        (2) a fraction containing the 2-methylbutene-2 oxide, and subsequently isomerizing and dehydrating said 2-methylbutene-2 oxide to isoprene in the presence of catalysts selected from the group consisting of acidic metal oxides, siliceous refractory oxides, and alkali and alkaline earth phosphates; and
        (3) a fraction containing tertiary amyl alcohol and the borate ester thereof and subsequently dehydrating and decomposing said fraction in the presence of solid acidic inorganic catalysts selected from acidic metal oxides and siliceous refractory oxide to produce 2-methylbutene-2 and oxyboron compound for recycle to the oxidation zone.

2. The process of claim 1 wherein the oxyboron alkyl ester compound is trialkoxyboroxine containing from 1 to 10 carbon atoms in each alkoxy group.

3. The process of claim 2 wherein the oxyboron compound is triamyloxyboroxine.

4. The process of claim 1 wherein the oxyboron compound is boron oxide.

References Cited

UNITED STATES PATENTS

| 3,210,381 | 10/1965 | Gash | 260—348.5 |
| 3,242,157 | 3/1966 | Linder | 260—348.5 |
| 3,068,291 | 12/1962 | Amir | 260—593 |
| 3,355,505 | 11/1967 | Tedeschi | 260—642 |
| 3,360,584 | 12/1967 | Kollar | 260—681 |
| 3,360,585 | 12/1967 | Winnick | 260—681 |

OTHER REFERENCES

"Hydroperoxides Give Olefins," Chem. Eng. News. p. 17 (Apr. 10, 1967).

DELBERT E. GANTZ, *Primary Examiner.*

GEORGE E. SCHMITKONS, *Assistant Examiner.*